US006757825B1

(12) United States Patent
MacKenzie et al.

(10) Patent No.: US 6,757,825 B1
(45) Date of Patent: Jun. 29, 2004

(54) SECURE MUTUAL NETWORK AUTHENTICATION PROTOCOL

(75) Inventors: Philip Douglas MacKenzie, Maplewood, NJ (US); Ram Swaminathan, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/353,468

(22) Filed: Jul. 13, 1999

(51) Int. Cl.[7] ............................................... H04L 9/30

(52) U.S. Cl. ..................... 713/169; 713/200; 713/201; 713/171; 713/155; 380/285; 380/30; 340/5.1

(58) Field of Search .................................. 713/171, 155, 713/169, 168, 200, 201, 202; 380/285, 283, 28, 30, 44; 340/5.1

(56) References Cited

U.S. PATENT DOCUMENTS

| | | | | |
|---|---|---|---|---|
| 5,241,599 | A | | 8/1993 | Bellovin et al. ............... 380/21 |
| 5,440,635 | A | | 8/1995 | Bellovin et al. ............... 380/25 |
| 6,088,805 | A | * | 7/2000 | Davis et al. ................. 713/202 |
| 6,134,327 | A | * | 10/2000 | Van Oorschot .............. 380/30 |
| 6,226,750 | B1 | * | 5/2001 | Trieger ....................... 713/201 |
| 6,275,941 | B1 | * | 8/2001 | Saito et al. ................. 713/201 |
| 6,385,318 | B1 | * | 5/2002 | Oishi .......................... 380/262 |
| 6,438,691 | B1 | * | 8/2002 | Mao ........................... 713/176 |
| 6,446,206 | B1 | * | 9/2002 | Feldbaum ................... 713/175 |
| 6,496,932 | B1 | * | 12/2002 | Trieger ....................... 713/168 |
| 6,550,011 | B1 | * | 4/2003 | Sims, III .................... 713/193 |
| 6,567,915 | B1 | * | 5/2003 | Guthery ...................... 713/168 |

OTHER PUBLICATIONS

H. Dobbertin, A. Bosselaers, and B. Preneel, "RIP-EMD-160: A Strengthened Version of RIPEMD", Fast Software Encryption, LNCS 1039, Springer–Verlag, 1996, pp. 71–82.

"Secure Hash Standard", Federal Information Processing Standards Publication (Supersedes FIPS PUB 180—May 11, 1993), U.S. Department of Commerce, Technology Administration, National Institute of Standards and Technology, Issued Apr. 17, 1995.

W. Diffie and M. E. Hellman, "New Directions in Cryptography", *IEEE Transactions On Information Theory*, vol. IT–22, No. 6, Nov. 1976, pp. 644–654.

R. L. Rivest, A. Shamir and L. Adleman, "A Method for Obtaining Digital Signatures and Public–Key Cryptosystems", *Communications of the ACM*, Feb. 1978, vol. 21, No. 2, pp. 120–126.

(List continued on next page.)

*Primary Examiner*—Ly V. Hua

(57) ABSTRACT

A password-only mutual network authentication protocol and key exchange protocol using a public key encryption scheme in which a server generates a public key/secret key pair and transmits the public key to a client. The client determines whether the public key was chosen in an acceptable manner, and if so, continues with the protocol. Otherwise, the client rejects authentication. If the protocol is continued, in one embodiment the client generates a parameter p as a function of the public key and a password (or, in an alternate embodiment, as a function of the public key and a function of a password). If the public key space mapping function $F_{PK}$ applied to p, $F_{PK}(p)$, is an element of the public key message space, then the protocol continues. If $F_{PK}(p)$ is not an element of the public key message space, then the client determines to reject authentication, but continues with the protocol so that the server does not gain any information about the password. If the client determines to reject authentication, it will terminate the protocol at a later step at which time the termination of the protocol cannot leak any sensitive information. If both the client and the server accept authentication, then session keys are generated for subsequent secure communication between the client and server. Specific embodiments are disclosed in which RSA is used as the public key encryption scheme.

62 Claims, 8 Drawing Sheets

OTHER PUBLICATIONS

S. Patel, "Number Theoretic Attacks on Secure Password Schemes", *Proceedings of the IEEE Symposium on Research in Security and Privacy*, pp. 236–247, 1997.

S. Lucks, "Open Key Exchange: How to Defeat Dictionary Attacks Without Encrypting Public Keys", Security Protocol Workshop, Ecole Normale Sup'erieure, Apr. 7–9, 1997.

T. Wu, "The Secure Remote Password Protocol", *Proceedings of the 1998 Internet Society Network and Distributed System Security Symposium*, pp. 97–111, 1998.

M. Steiner, G. Tsudik, and M. Waidner, "Refinement and Extension of Encrypted Key Exchange", *ACM Operating System Review*, 29:22–20, 1995.

S. M. Bellovin and M. Merritt, "Augmented Encrypted Key Exchange: a Password–Based Protocol Secure Against Dictionary Attacks and Password File Compromise", *Proceedings of the First Annual Conference on Computer and Communications Security*, 1993, pp. 244–250.

S. M. Bellovin and M. Merritt, "Encrypted Key Exchange: Password–Bases Protocols Secure Against Dictionary Attacks", *Proceedings of the IEEE Symposium on Research in Security and Privacy*, Oakland, May 1992.

D. P. Jablon, "Strong Password–Only authenticated Key Exchange", *ACM Computer Communications Review, ACM SIGCOMM*, 26(5):5–20, 1996.

D. Jablon, "Extended Password Key Exchange Protocols Immune To Dictionary Attack", WETICE Workshop On Enterprise Security, 1997.

\* cited by examiner

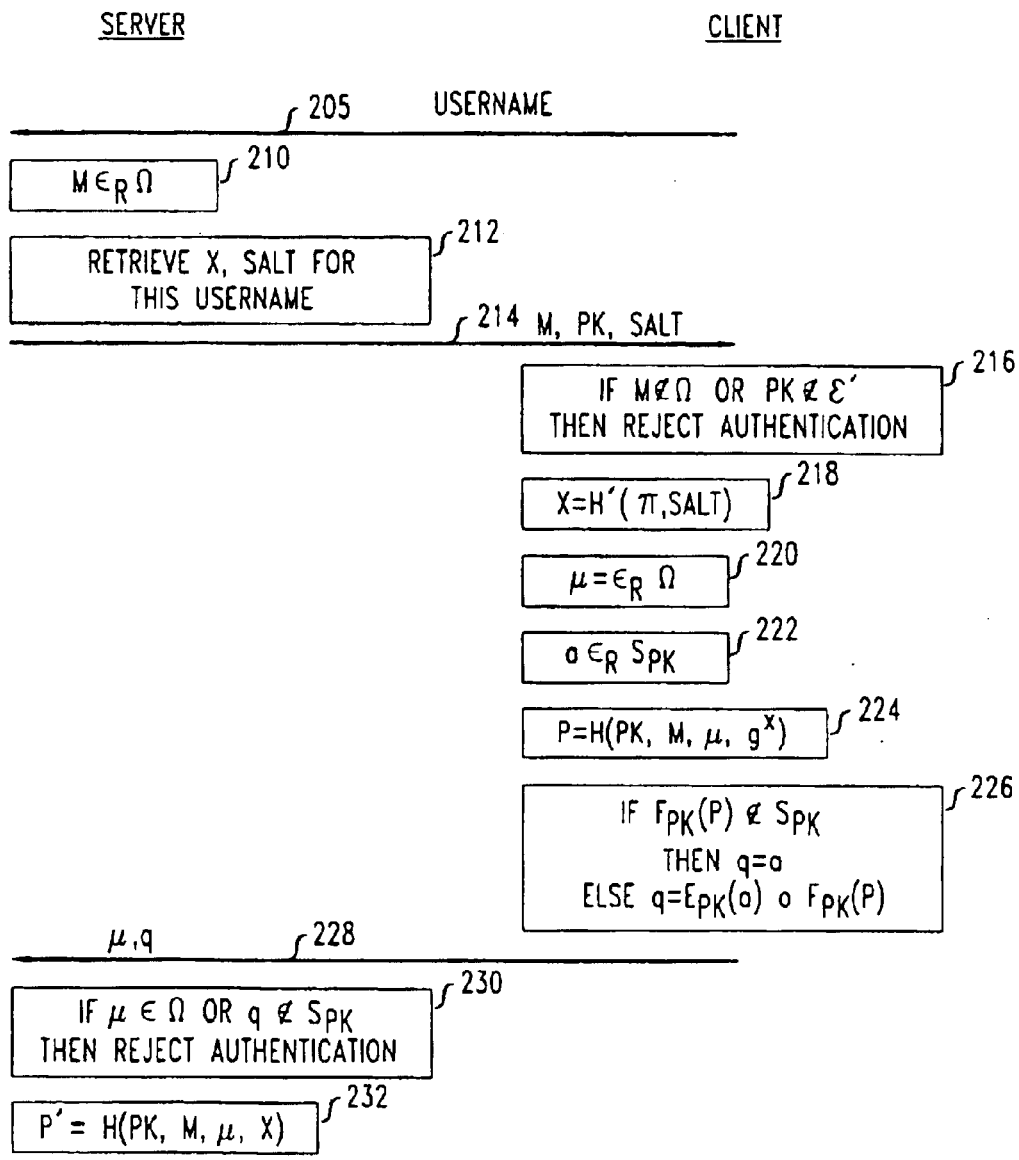

SECURE MUTUAL NETWORK AUTHENTICATION PROTOCOL

FIELD OF THE INVENTION

The present invention relates generally to network authentication and key exchange. More particularly, the present invention relates to a password-only secure mutual network authentication and key exchange protocol.

BACKGROUND OF THE INVENTION

Authentication over a network is an important part of security for systems that allow remote clients to access network servers. Authentication is generally accomplished by verifying one or more of the following:

something a user knows, e.g. a password;

something a user is, i.e., biometric information, such as a fingerprint; and something a user has, i.e., some identification token, such as a smart-card.

For example, an automatic teller machine (ATM) verifies two of these: something a user has, the ATM card, and something a user knows, a personal identification number (PIN). ATM authentication is significantly easier than authentication over a data network because the ATM itself is considered trusted hardware, such that it is trusted to verify the presence of the ATM card and to transfer the correct information securely to a central transaction server.

In addition to authentication, key exchange is an important part of communication across a data network. Once a client and server have been authenticated, a secure communication channel must be set up between them. This is generally accomplished by the client and server exchanging keys for use during communication subsequent to authentication.

Authentication over a data network, especially a public data network like the Internet, is difficult because the communication between the client and server is susceptible to many different types of attacks. For example, in an eavesdropping attack, an adversary may learn secret information by intercepting communication between the client and the server. If the adversary learns password information, the adversary may replay that information to the server to impersonate the legitimate client in what is called a replay attack. Replay attacks are effective even if the password sent from the client is encrypted because the adversary does not need to know the actual password, but instead must provide something to the server that the server expects from the legitimate client (in this case, an encrypted password). Another type of attack is a spoofing attack, in which an adversary impersonates the server, so that the client believes that it is communicating with the legitimate server, but instead is actually communicating with the adversary. In such an attack, the client may provide sensitive information to the adversary.

Further, in any password based authentication protocol, there exists the possibility that passwords will be weak such that they are susceptible to dictionary attacks. A dictionary attack is a brute force attack on a password that is performed by testing a large number of likely passwords (e.g. all the words in an English dictionary) against some known information about the desired password. The known information may be publicly available or may have been obtained by the adversary through one of the above described techniques. Dictionary attacks are often effective because users often choose easily remembered, and easily guessed, passwords.

There are various known techniques for network authentication. These known techniques will be divided into two classifications. The first classification includes those techniques that require persistent stored data on the client system. The second classification includes those techniques which do not require persistent stored data on the client system.

With respect to the first classification, persistent stored data may include either secret data (e.g. secret keys shared with the authenticating server) which must never be revealed, or non-secret but sensitive data (e.g. the authenticating server's public key) which must be tamper-proof. With either type of persistent data, extra security requirements are necessary to secure the data from attack from an adversary. Further, when using an authentication protocol which relies on both passwords and persistent stored data, a compromise of either may lead to a vulnerability of the other. For example, compromising a secret key may lead to a possible dictionary attack on the password. Another problem with this first class of protocols is that persistent stored data requires generation and distribution of keys, which can be cumbersome, and generally provides a less flexible system.

The second classification is called password-only authentication protocols because there is no requirement of persistent stored data at the client. The client only needs to be able to provide a legitimate password. The notion of providing strong security and authentication using potentially weak passwords seems to be contradictory. However, there exist several password-only user authentication and key exchange protocols that are designed to be secure. A description of these protocols may be found in D. Jablon, *Strong Password-Only Authenticated Key Exchange*, ACM Computer Communication Review, ACM SIGCOMM, 26(5): 5–20,1996. Some of the more notable of these password-only protocols includes Encrypted Key Exchange (EKE) described in S. M. Bellovin and M. Merritt, *Encrypted Key Exchange: Password-Based Protocols Secure Against Dictionary Attacks*, Proceedings of the IEEE Symposium on Research in Security and Privacy, pp. 72–84, 1992; Augmented-EKE (A-EKE), S. M. Bellovin and M. Merritt, *Augmented Encrypted Key Exchange: A Password-Based Protocol Secure Against Dictionary Attacks and Password File Compromise*, Proceedings of the First Annual Conference on Computer and Communications Security, 1993, pages 244–250; Modified EKE (M-EKE), M. Steiner, G. Tsudik, and M. Waidner, *Refinement and Extension of Encrypted Key Exchange*, ACM Operating System Review, 29:22–30, 1995; Simple Password EKE (SPEKE) and Diffie-Hellman EKE (DH-EKE), both described in D. Jablon, *Strong Password-Only Authenticated Key Exchange*, ACM Computer Communication Review, ACM SIGCOMM, 26(5):5–20,1996; Secure Remote Password Protocol (SRP), T. Wu, *The Secure Remote Password Protocol*, Proceedings of the 1998 Internet Society Network and Distributed System Security Symposium, pages 97–111, 1998; and Open Key Exchange (OKE), Stefan Lucks, *Open Key Exchange: How to Defeat Dictionary Attacks Without Encrypting Public Keys*, Security Protocol Workshop, Ecole Normale Sup'erieure, Apr. 7–9, 1997.

The problem with these known password-only authentication protocols is that they have not been proven secure. In fact, the EKE protocol may be susceptible to certain number theoretic attacks as described in S. Patel, *Number Theoretic Attacks on Secure Password Schemes*, Proceedings of the IEEE Symposium on Research in Security and Privacy, pages 236–247, 1997. In view of the importance of network security, there is a need for a password-only mutual authentication protocol which is provably secure.

SUMMARY OF THE INVENTION

The present invention provides a secure password-only mutual network authentication protocol utilizing a public key encryption scheme. The particular public key encryption scheme used to implement the protocol must be a so-called usable encryption scheme, as defined below. A network server generates public key/secret key pairs in accordance with the public key encryption scheme and transmits a public key to a client. The client determines whether the received public key is an element of a so-called testable superset (as defined below) of the set of all public keys of the public key encryption scheme. This determination is able to be made because of the requirement that the public key encryption scheme be usable. The determination by the client as to whether the public key is an element of a testable superset provides the client with a technique for determining whether the server has provided a public key which was chosen in an appropriate manner. If the public key is found not to be within the testable superset, then authentication is rejected by the client. Otherwise, the protocol continues.

In one embodiment of the invention, the client and server are both in possession of a password which is used for authentication purposes. In this embodiment, the client continues the protocol by generating a parameter p as a function of at least the public key and password. If the public key space mapping function, $F_{PK}$, applied to p, $F_{PK}(p)$, is an element of the so-called message space of the public key, then the protocol continues by the client encrypting a substantially random element of the message space of the public key using the public key and performing the group operation of the public key message space on the result and $F_{PK}(p)$. Alternatively, if $F_{PK}(p)$ is not an element of the message space, then the client determines to reject authentication. However, if the client were to notify the server of the rejection at this point, the server may be able to extract some useful information about the password. As such, although the client has determined to reject authentication, the client continues with the protocol so as not to leak any information to the server. The client rejects authentication later in the protocol at which time the server cannot gain any useful information about the password.

In a second embodiment of the invention, in order to protect against a security compromise at the server, the server is not in possession of the password, but instead is provided with, and stores, a value which is a function of the password. The password itself cannot be determined from the value stored at the server.

Third and fourth embodiments of the invention utilize the RSA encryption scheme as a usable public key encryption scheme. In accordance with these embodiments, RSA specific tests are provided for determining whether the server provided public key is an element of the testable superset of the set of all RSA public keys. In addition, RSA specific tests are provided for determining whether certain values are elements of the RSA message space. In the third embodiment, the server stores the shared password. In the fourth embodiment, the server stores a value which is a function of the password.

The inventors have proven that a mutual authentication protocol in accordance with the present invention is as secure as the underlying public key encryption scheme. Thus, in the RSA specific embodiments, the inventors have proven that the protocol is as secure as the RSA encryption scheme. An outline of the proof is provided.

These and other advantages of the invention will be apparent to those of ordinary skill in the art by reference to the following detailed description and the accompanying drawings.

BRIEF DESCRIPTION OF THE DRAWINGS

FIGS. 2A–2B show an embodiment of the authentication protocol in which the server stores a value which is a function of the password;

DETAILED DESCRIPTION

Figure 1A:
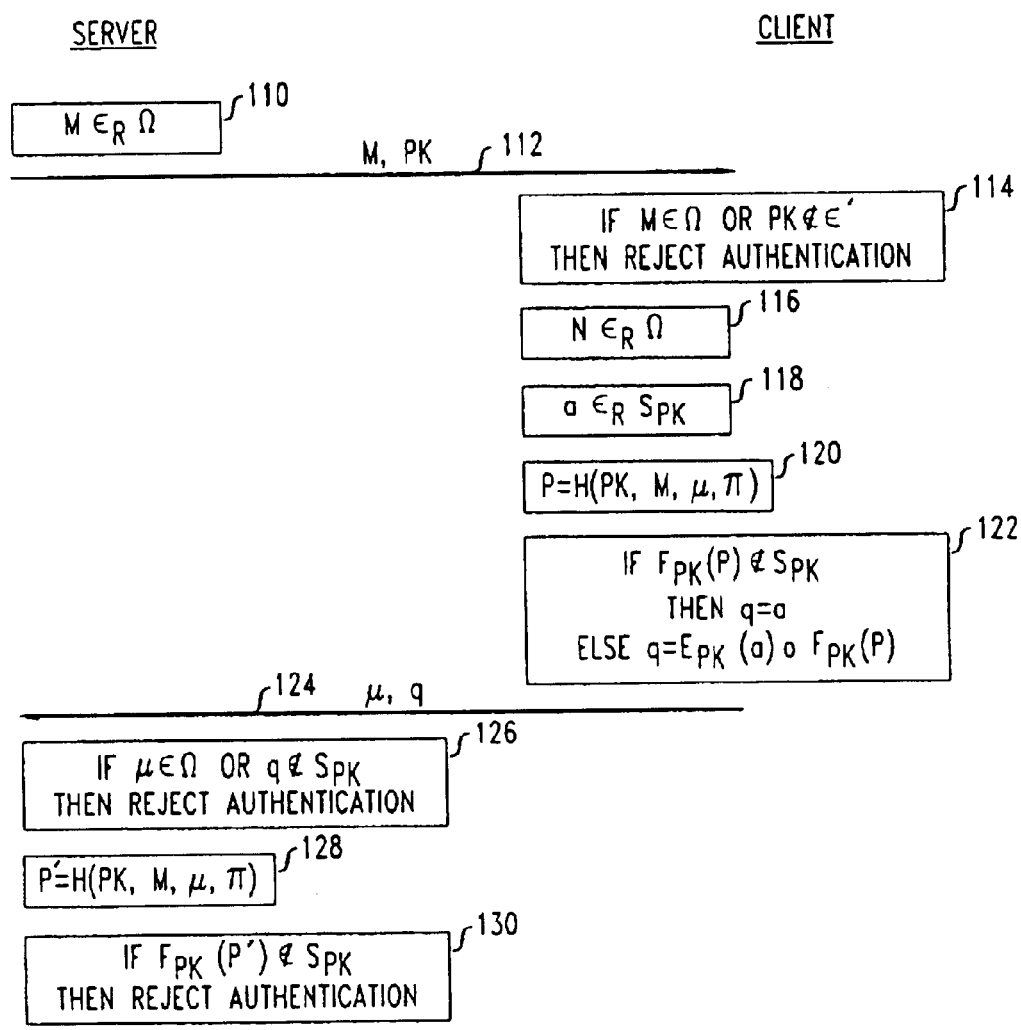
FIGS. 1A–1B show an embodiment of the authentication protocol in which the server stores the password.

Cryptography is a well known technique for providing secure communication between two parties. Prior to describing the various embodiments of the present invention, some background and basic terminology will be provided.

We will first describe encryption schemes. In private key encryption schemes, a message m may be encrypted using an encryption function E and a secret key K in order to generate a ciphertext C. This is represented as $C=E_K(m)$. The ciphertext C may be securely transmitted between two parties who share the secret key K. The ciphertext may be decrypted using a decryption function D and the secret key K in order to recover the original message m. This is represented as $m=D_K(C)$.

In public key encryption schemes, there exist public key (PK) and secret key (SK) pairs (PK, SK). The public key is not secret, and anyone may encrypt a message m using the public key to create ciphertext C such that $C=E_{PK}(m)$. The ciphertext can only be decrypted using the secret key such that $m=D_{SK}(C)$. The ciphertext cannot be decrypted using the public key. Public key cryptography is well known in the art.

One well known public key encryption scheme is RSA, which is described in R. Rivest, A. Shamir, L. Adleman, *A Method for Obtaining Digital Signature and Public Key Cryptosystems*, Communications of the ACM, vol. 21, 120–126, 1978. In RSA, the public key is (N,e) and the secret key is (N,d), where N is the product of two large randomly chosen primes p and q (i.e., $N=p \cdot q$), e is an arbitrary number greater than 2 such that the greatest common divisor of e and $(p-1) \cdot (q-1)$ is 1, and $d=e^{-1} \mod (p-1) \cdot (q-1)$. The encryption function is $E(m)=m^e \mod N$ and the decryption function is $D(C)=C^d \mod N$.

We now discuss some other cryptographic terminology. Informally, a function f from a set S to a set T is a one-way function if $f(x)$ is easy to compute for all x in S but for most y in T, it is computationally infeasible to find any x in S where $f(x)=y$. One example of a one-way function is modular exponentiation. Let p be a large prime and g a generator of the multiplicative group mod p (that is, the numbers in the range $1, \ldots, p-1$). Then $f(x)=g^x \mod p$ is generally assumed to be a one-way function. The inverse function, called the discrete log function, is difficult to compute. There are also other groups in which the discrete log function is difficult to compute, such as certain elliptic curve groups. A key exchange protocol called Diffie-Hellman Key Exchange and described in W. Diffie and M. Hellman, *New Directions in*

*Cryptography*, IEEE Transactions on Information Theory, vol. 22, no. 6, 644–654, 1976, is based on this function. Specifically, two parties Alice and Bob agree on a secret key as follows: Alice chooses a random x and sends $X=g^x$ mod p to Bob, while Bob chooses a random y and sends $Y=g^y$ mod p to Alice. The secret key can be computed by Alice as $Y^x$ mod p, and by Bob as $X^y$ mod p. Note that $Y^x = X^y = g^{xy}$ mod p. Diffie-Hellman key exchange can also be performed over other groups in which the discrete log function is difficult to compute, such as certain elliptic curve groups. Informally, a function h from a set S to a set T will be called a random hash function if the output of h looks random or at least is unpredictable until the function is computed with an input x in S. Known functions that generally behave this way are SHA-1, described in FIPS 180-1, *Secure Hash Standard*, Federal Information Processing Standards Publication 180-1, 1995; and RIPEMD-160, described in H. Dobbertin, A. Bosselaers, B. Preneel, RIPEMD-160: *a strengthened version of RIPEMD*, In Fast Software Encryption, 3rd Intl. Workshop, 71–82, 1996.

In general, cryptographic schemes have security parameters which describe their level of security. We will use k as the security parameter for hash functions (where $$\frac{1}{2^k}$$

is assumed to be negligibly small), and we will use l as the security parameter for public key encryption schemes, and in particular we will assume the RSA modulus N will be l bits long.

Figure 1B:
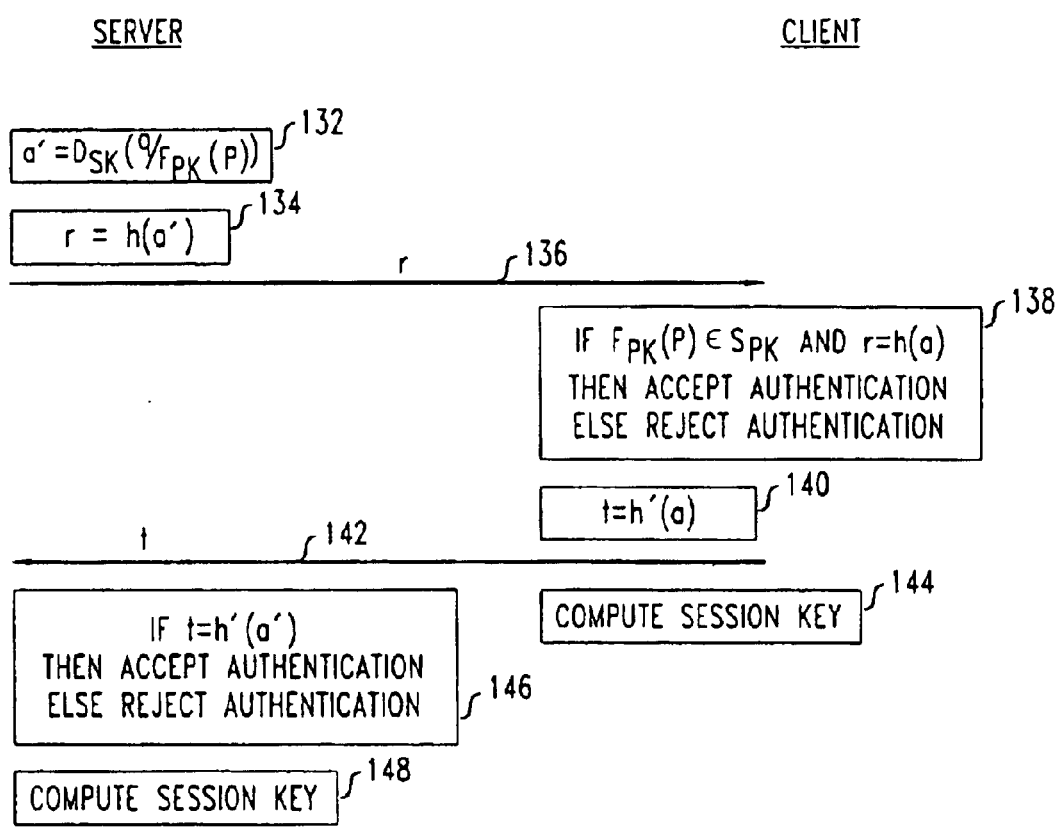

A mutual authentication protocol in accordance with a first embodiment of the invention is shown in FIGS. 1A–1B. Steps shown on the left side of the figure are performed by a server and steps shown on the right side of the figure are performed by a client. Arrows represent communication between the client and the server. In accordance with the protocol, the server will authenticate itself to the client and the client will authenticate itself to the server. After both sides have authenticated, each will generate a secret key, called a session key, which may be used for subsequent secure communication.

Prior to initiation of the protocol it is assumed that the client and the server are in possession of certain information. The server generates public key/secret key pairs (PK, SK) in accordance with the particular public key encryption scheme being used. The generation of public key/secret key pairs is well known in the art and will not be described herein. The server and client are both in possession of a password π (i.e., a shared secret) which the client uses to authenticate with the server. The password or must be set up in advance between the client and the server, and should be chosen independently for each client-server pair, or chosen in such a way as to be unique for each client-server pair.

It is noted that the following protocol authenticates both the server and the client. Thus, neither the server nor the client are assumed to be authentic, and thus either the server or the client may be an adversary. The client may be an adversary attempting to authenticate itself and gain access to the server. The server may be an adversary attempting to spoof another authentic server in an attempt to gain sensitive information from an unsuspecting client.

As would be readily apparent to one of ordinary skill in the art, the server and client may be implemented as programmed computers operating under control of computer program code. The computer program code would be stored in a computer readable medium (e.g. a memory) and the code would be executed by a processor of the computer. Given this disclosure of the invention, one skilled in the art could readily produce appropriate computer program code in order to implement the protocols described herein. The client and server communicate with each other via a data network. Such networked programmed computers are well known in the art and will not be described in further detail herein.

Referring now to FIGS. 1A–1B, upon initiation of the protocol, in step 110 the server generates m, which is a random element of the set Ω. Ω represents a set which is large enough to ensure that the probability of generating two equivalent m values is negligible. Ω may be of a form to allow for subsequent key exchange. In step 112, the server transmits m and PK to the client. As stated above, it is assumed that the server has generated (PK, SK) pairs prior to initiation of the protocol. In step 114 the client determines whether the m received from the server in step 112 is in the set Ω and whether PK is in a set ε' (which is described in detail below). If either of the tests is false, then the client rejects authentication. The test of step 114 is performed by the client because an adversary spoofing the legitimate server may choose m and PK in such a manner that, if the client proceeds with the protocol, the adversary could learn some information about the password π.

At this point, a description of what is meant by PK being in the set ε is provided. As stated above, in order for the protocol to operate correctly and not leak any sensitive information, the public key/secret key pair (PK, SK) must be chosen in an appropriate manner in accordance with the particular public key encryption scheme being used. Given a particular public key encryption scheme, it would be ideal to be able to determine whether the PK received from the server in step 112 is an element of the set ε of all possible public keys that may be generated using that particular public key encryption scheme. However, there is no known public key encryption scheme (with all the properties required for the protocol) which would allow this determination to be made within a reasonable time period. Thus, we define a usable public key encryption scheme and a testable superset ε' as follows:

A public key encryption scheme is usable if there exists a testable superset ε' of ε such that:

1. for all PK $\in$ ε', $|S_{PK}|$ is superpolynomial in k, where $S_{PK}$ represents the set of all possible messages that can be encrypted using PK and the encryption of all such possible messages. We call this set SPK the message space of the public key (PK).
2. there is a polynomial-time algorithm to determine for any PK whether PK $\in$ ε';
3. for all PK $\in$ ε', there is an expected polynomial-time algorithm to uniformly draw an element from $S_{PK}$;
4. for all PK $\in$ ε', there is a polynomial time algorithm to determine for any value a, if a $\in S_{PK}$; and
5. for all PK $\in$ ε', there exists an integer $\eta \geq l+k$, a polynomial-time computable public key space mapping finction $F_{PK}$ with domain $\{0,1\}^\eta$, and a partition of that domain into $X_{PK} \cup \ldots \cup X_{PK,s_{PK}} \cup Z_{PK} \cup Z'_{PK}$ (the partition depends only on PK) such that:
   (a) $s_{PK}$ can be computed in polynomial-time,
   (b) $F_{PK}, X_{PK,i} \to S_{PK}$ is 1-1 and onto, for i $\in \{1, \ldots, s_{PK}\}$, (i.e. $F_{PK}$ includes a bijection from each set $X_{PK,i}$ to $S_{PK}$),
   (c) for each a $\in S_{PK}$ and i $\in \{1, \ldots, s_{PK}\}$, there is a polynomial—time algorithm to find x $\in X_{PK,i}$ so that $F_{PK}(x)=a$, (d) given $x \in \{0,1\}^n$, there are polynomial—time algorithms to test if $x \in Z_{PK}$ or $x \in Z'_{PK}$, (e) for each $x \in Z_{PK}$, $F_{PK}(x) \notin S_{PK}$, (f) $|Z'_{PK}|/2^n$ is negligible with respect to the security parameter k, and (g) if $E \in \epsilon$, then $|Z_{PK} \cup Z'_{PK}|/2^n$ with respect to the security parameter k.

We note that the definition of usable could be readily extended by one skilled in the art to include encryption schemes in which the set of messages that can be encrypted using PK is not equal to the set of encrypted messages. One skilled in the art could readily modify the protocols described herein for use with such an encryption scheme. Thus, with respect to the public key PK, the test in step 114 determines whether PK is an element of the testable superset $\epsilon'$ of $\epsilon$. If the test in step 114 is false (i.e., m is an element of $\Omega$ and PK is an element of $\epsilon'$) then authentication continues. However, if the test in step 114 is true (i.e. m is not an element of $\Omega$ or PK is not an element of $\epsilon'$) then authentication is rejected by the client because the server has chosen PK and/or m in an improper manner.

In step 116, the client sets parameter $\mu$ to be a random element of the set $\Omega$. In step 118, the client sets parameter a to be a random element of the message space $S_{PK}$. In step 120, the client calculates parameter p as a random hash function H of parameters (PK,m,$\mu$,$\pi$). The hash function H, may be any random hash function as described above that outputs a sufficient number of bits (at least $\eta$).

In step 122 it is determined whether the public key space mapping function, $F_{PK}$, applied to p, $F_{PK}(p)$, is an element of the message space $S_{PK}$. If $F_{PK}(p)$ is not an element of $S_{PK}$, then authentication should be rejected. However, if it is determined in step 122 that $F_{PK}(p) \notin S_{PK}$, it is undesirable to terminate authentication at this point because an adversary server may gain some knowledge of the password or if the client terminates authentication at this point. Therefore, it is desirable that the client continue the protocol with the server, even if the client has decided that it will reject authentication. Thus, if the test in step 122 is true, then the client sets q=a. By setting sets q=a, where a was chosen in step 118 as a substantially random element of the message space, an adversary server will not gain any information about the password $\pi$. If it is determined in step 122 that $F_{PK}(p) \in S_{PK}$, then the client will move forward with the authentication protocol by calculating $q = E_{PK}(a) \circ F_{PK}(p)$. Thus, a is encrypted using the public key with $F_{PK}(p)$ being applied to the resulting encryption using the group operation of the public key message space. In step 124, $\mu$,q is sent to the server.

In step 126 the server determines whether $\mu \in \Omega$ and q $\in S_{PK}$. If either $\mu \notin \Omega$ or q $\notin S_{PK}$, then the server rejects authentication. Otherwise, in step 128 the server calculates parameter p' as a random hash fuiction H of parameters (PK,m,$\mu$,$\pi$). This step 128 is performed in a manner similar to that described above in connection with step 120. In step 130 the server determines whether $F_{PK}(p')$ is an element of the message space $S_{PK}$ and if not, then the server rejects authentication. If $F_{PK}(p')$ is an element of the message space $S_{PK}$ then authentication continues. In step 132, the server calculates a' by decrypting $q/F_{PK}(p')$ using the secret key SK (where/denotes the inverse of the group operation of the public key message space). In step 134 the server calculates r as a random hash function h applied to a'. In step 136 the server sends r to the client.

In step 138 the client determines whether $F_{PK}(p) \in S_{PK}$ and r=h(a). Only if both of these conditions are true does the client accept the server as authentic. Recall that if $F_{PK}(p)$ $\notin S_{PK}$ then the client already decided not to accept the server in step 122, but went on with the authentication protocol so that an adversary could not gain any information from the rejection of authentication at step 122. The test for r=h(a) tests whether the server possessed the correct password $\pi$. Thus, at step 138 the client may reject authentication either because $F_{PK}(p) \notin S_{PK}$ or r$\neq$h(a) and the server cannot determine for which reason authentication was rejected. If the client determines to accept the server in step 138, then in step 140 the client calculates t=h'(a), where h' is a random hash function. In step 142 the client sends t to the server.

In step 146 the server determines whether t=h'(a'). If t=h'(a') then the server accepts authentication. Otherwise, the server rejects authentication. If both the client and server have accepted authentication, then in step 144 the client computes a session key and in step 148 the server computes a session key. The session key acts as a shared secret key and is used for subsequent secure communication between the client and the server. The use of a secret key in such a manner is more efficient for subsequent secure communication than the continued use of public key cryptography. In one embodiment, the session key K may be calculated by both the server and client as a random hash function h" of a such that K=h"(a). In an alternate embodiment, the session key K may be calculated by both the server and client using the Diffie-Hellman protocol with m and $\mu$ chosen as Diffie-Hellman parameters. As would be apparent to one skilled in the art, various alternative techniques may be used to generate the session keys.

Thus, the protocol described in conjunction with FIGS. 1A–1B will provide for mutual authentication of a client and a server using a public key encryption scheme which is usable as defined above. The protocol described in conjunction with FIGS. 1A–1B assumed that the server possessed and stored the password $\pi$. One potential problem with such a protocol is that a security compromise of server storage may allow an adversary to obtain the passwords of clients. In order to protect against such an occurrence, we now describe a second embodiment of the invention in which the server does not possess the password $\pi$, but instead stores a value X which is a function of the password $\pi$ and a salt value. The salt value is a publicly known value which is used to prevent dictionary attacks on multiple passwords at the same time by forcing an adversary to perform separate dictionary attacks for each salt value. The value X is supplied to the server by the client, and thus, the server only knows X and cannot determine $\pi$ from knowledge of X. The client computes X as $X=g^x$, where g is a generator in some group where the discrete log is difficult to compute, x=H' ($\pi$,salt), and H' represents a one way random hash function. In a manner similar to that described above in connection with the first embodiment shown in FIG. 1, the server generates public key/secret key pairs (PK, SK) in accordance with the particular public key encryption scheme being used.

Figure 2B:
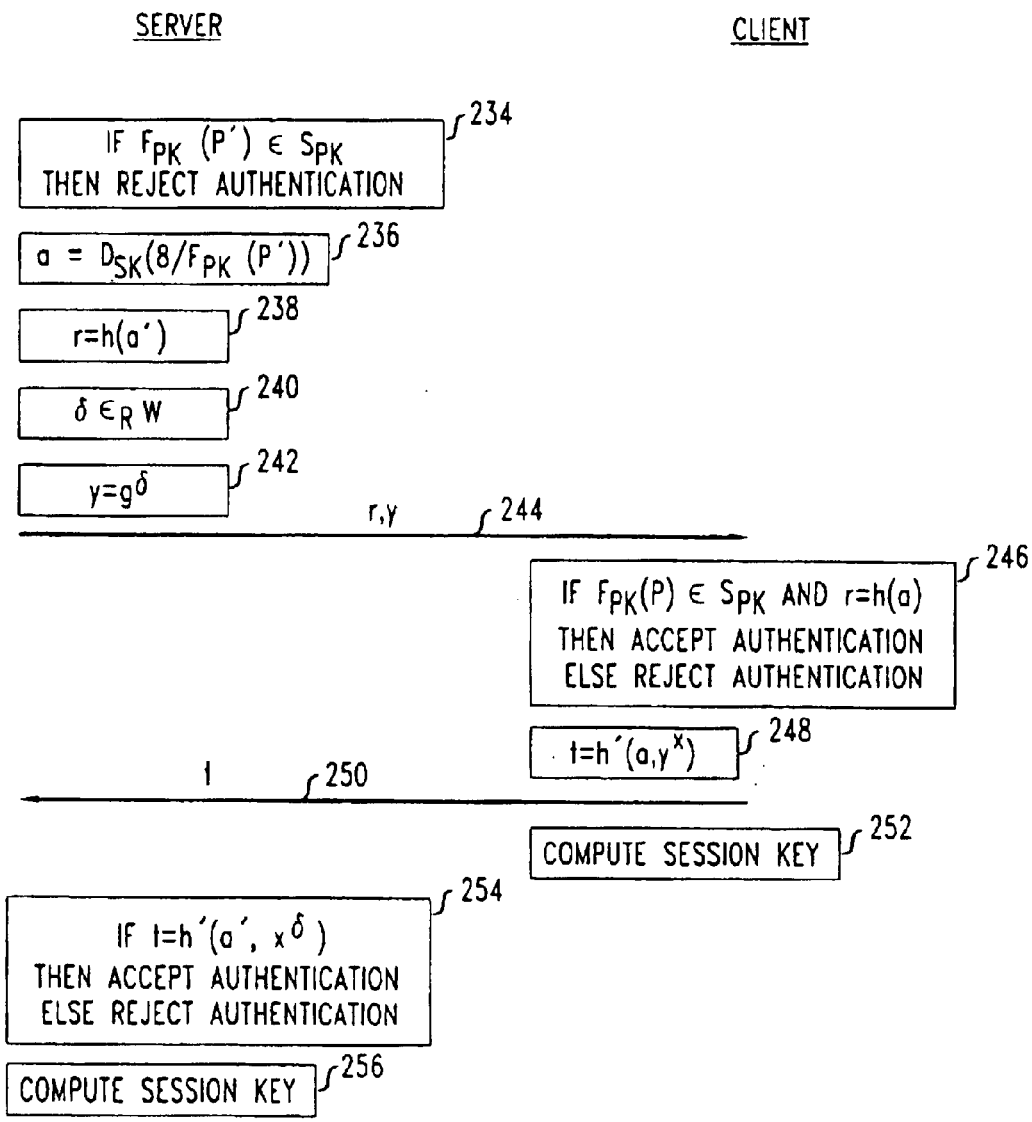

The protocol in accordance with the second embodiment of the invention will now be described in conjunction with FIGS. 2A–2B. The client initiates the protocol in step 205 by sending the client's username to the server. In step 210 the server generates m as a random element of $\Omega$. In step 212 the server retrieves from storage X and salt associated with the username received in step 205. In step 214 the server sends m, PK and salt to the client. In step 216 the client determines whether the m received from the server in step 214 is in the set $\Omega$ and whether PK is in the testable superset $\epsilon'$. If either of the tests is false, then the client rejects authentication. Otherwise, authentication continues and in step 218 the client calculates x=H'(π,salt) using the salt received from the server in step 214, and where H' is a random hash function. In step 220, the client sets parameter $\mu$ to be a random element of the set $\Omega$, and in step 222 the client sets parameter a to be a random element of the message space $S_{PK}$. In step 224 the client calculates parameter p as a random hash function H of parameters (PK,m,$\mu$,g$^x$). This step 224 is similar to step 120 of the first embodiment, except in this second embodiment, instead of using the password π as one of the parameters in determining p, a function of the password π, namely g$^x$, is used as one of the parameters instead. Steps 226, 228, and 230 then proceed as described above in conjunction with steps 122, 124, and 126 respectively.

In step 232 the server calculates parameter p' as a random hash function H of parameters (PK,m,$\mu$,X). This step is similar to step 128 of the first embodiment, except in step 232, since the server does not know π, it instead uses X as a parameter of the hash function. Steps 234, 236, and 238 proceed as described above in conjunction with steps 130, 132, and 134 respectively. In step 240 $\gamma$ is chosen as a random element of the set W, where W represents a set of possible exponents of g resulting in a sufficiently large set of distinct g$^\gamma$ values. In step 242 y is set to g$^\gamma$. In step 244 the server sends r and y to the client. Step 246 proceeds as described above in conjunction with step 138. In step 248 the client calculates t=h'(a,y$^x$), and in step 250 the client sends t to the server.

In step 254 the server determines whether t=h' (a', X$^\gamma$). If t=h' (a', X$^\gamma$) then the server accepts authentication. Otherwise, the server rejects authentication. If both the client and server have accepted authentication, then in step 252 the client computes a session key and in step 256 the server computes a session key.

The first and second embodiments of the invention, described above in conjunction with FIGS. 1A–1B and 2A–2B respectively, describe authentication protocols for use with a public key encryption scheme which satisfies the requirement of being usable, as described above. One such usable public key encryption scheme is the RSA public key encryption scheme with parameters chosen in accordance with certain restrictions as described below. We now describe third and fourth embodiments of the invention. The third embodiment utilizes RSA as the public key encryption scheme with a stored password π at the server. The fourth embodiment utilizes the RSA public key encryption scheme with a value X stored at the server, where X is a function of the password π and a salt value. Thus, embodiments three and four are the RSA specific embodiments corresponding to embodiments one and two respectively.

Figure 3A:
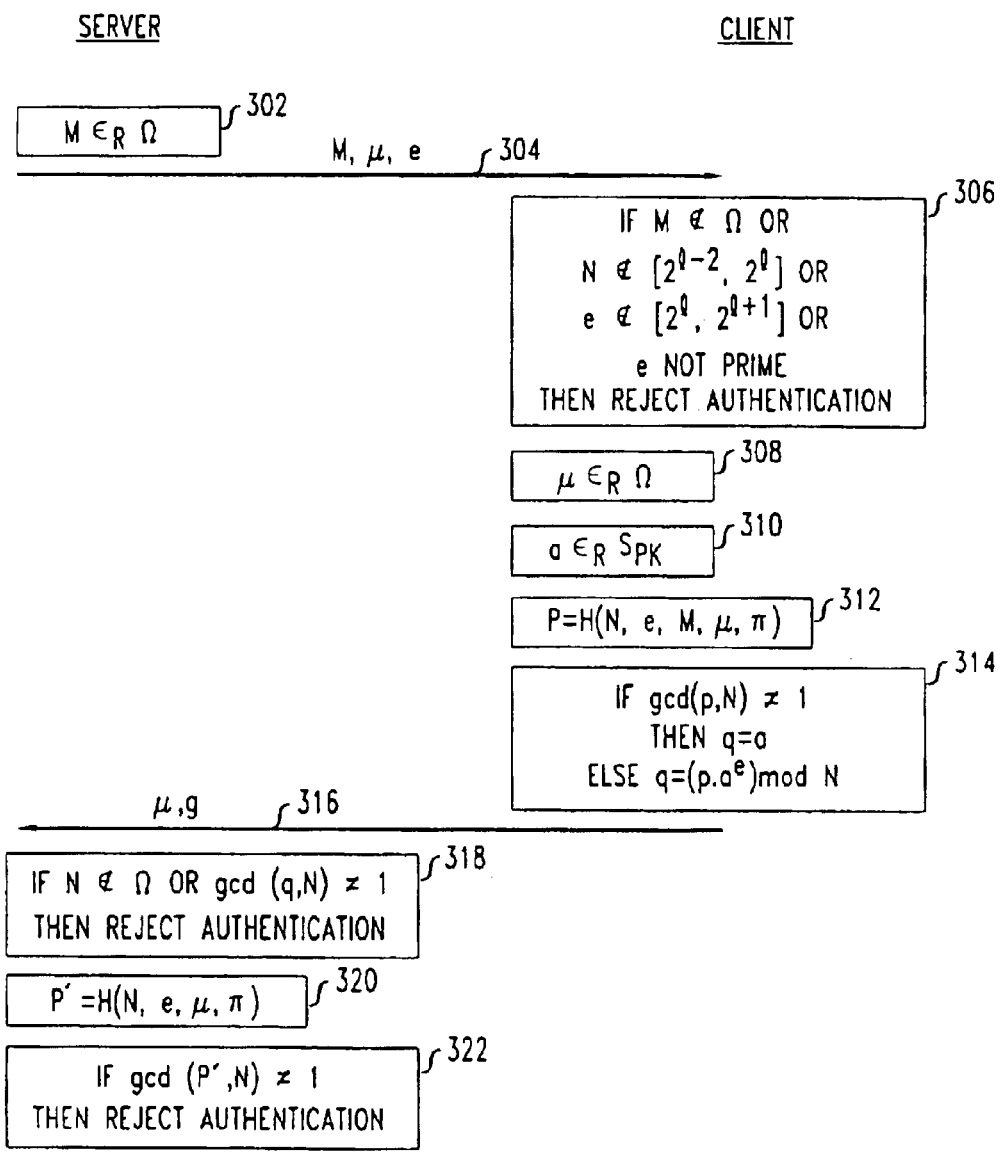
FIGS. 3A–3B show an RSA specific embodiment of the authentication protocol in which the server stores the password.
Figure 3B:
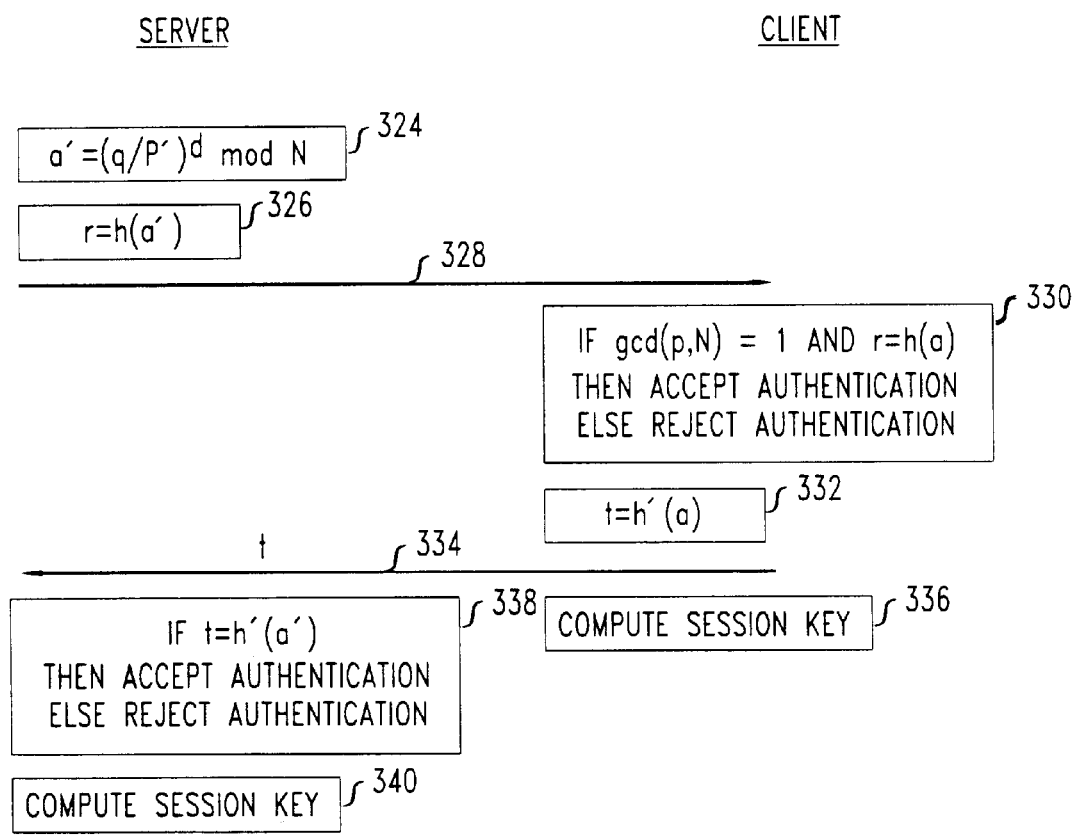

The third embodiment of the invention will now be described in conjunction with FIGS. 3A–3B. In the RSA public key encryption scheme, a public key PK is made up of two parameters (N, e) and a secret key SK is made up of two parameters (N, d). In a usable form of the RSA public key encryption scheme, the public key PK (N,e) is chosen such that N is large, and e is guaranteed to have the property that anyone knowing (N,e) can easily test that for any prime factor r of N, the greatest common divisor of e and (r−1) is 1. Some suitable methods to accomplish this are described below. It is assumed that the server has generated an appropriate (PK, SK) pair prior to initiation of the protocol. In step 302 the server generates m as a random element of $\Omega$. In step 304 the server transmits m, N, and e, to the client. As described above in conjunction with step 114 of FIG. 1A, the client must next determine whether m and the private key PK received from the server were chosen in an appropriate manner to protect against the adversary choosing these values in a manner which would allow it to learn some information about the password π. Thus, in step 306 the client determines whether the m received from the server in step 112 is in the set $\Omega$ and whether PK is in the testable superset $\epsilon'$ (as defined above). In an RSA implementation, one way to determine whether PK is in the testable superset $\epsilon'$ is to determine whether N and e satisfy the following conditions:

$N \in [2^{l-2}, 2^l]$;

$e \in [2^l, 2^{l+1}]$ and e is prime.

If N and e satisfy all of the above conditions, then PK $\in \epsilon'$. These conditions include tests of whether N is sufficiently large (by determining whether N is within the range $2^{l-2}$ to $2^l$) and whether e is greater than N (by determining whether e is within the range $2^l$ to $2^{l+1}$). If any of the conditions shown in step 306 of FIG. 3A are false, then authentication is rejected. Otherwise, the protocol continues with step 308. It is noted that there is another alternative test to determine whether PK $\in \epsilon'$ in an RSA embodiment. The alternative test is to determine whether the following conditions are satisfied:

$e \geq \sqrt{N}$;

N mod e is not divisible by N; and e is prime.

If N and e satisfy all of these conditions, then PK $\in \epsilon'$.

It is noted that there are other tests which could be used to determine whether PK $\in \epsilon'$ in an RSA specific embodiment. For example, instead of testing whether e is prime, e could be a fixed publicly known value and e can be tested to confirm that it equals the fixed value. One skilled in the art would be able to implement other tests to determine whether PK $\in \epsilon'$ in an RSA specific embodiment.

Steps 308, 310, 312 proceed as described above in conjunction with steps 116, 118, 120 of FIG. 1A respectively. It is noted that the computation in step 120 (FIG. 1) is the same as that shown in step 312 (FIG. 3A) with the general PK of FIG. 1 being replace by N and e in the RSA specific implementation of FIGS. 3A–3B. The next test is to determine whether $F_{PK}(p)$ is an element of the message space of the RSA public key (i.e. $F_{PK}(p) \in S_{PK}$). In the RSA specific embodiment, this may be accomplished by determining whether the greatest common divisor (gcd) of p and N equals 1. If gcd(p, N)=1, then $F_{PK}(p) \in S_{PK}$ and in step 314 the client calculates q=(p·a$^e$) mod N. If gcd(p, N)≠1 then $F_{PK}(p) \in S_{PK}$ and therefore authentication should be rejected. However, as described above in conjunction with step 122 of FIG. 1A, it is undesirable to terminate authentication at this point because doing so may allow an adversary server to gain some knowledge of the password π. Therefore, it is desirable that the client continue the protocol with the server, even if the client has decided that it will reject authentication. Thus, if the test in step 314 is true, then the client sets q to a substantially random element of the message space by setting q=a. In step 316 the client transmits $\mu$,q to the server.

In step 318 the server determines whether $\mu \in \Omega$ and q $\in S_{PK}$. The test of whether q $\in S_{PK}$ (i.e., q is an element of the message space of the RSA public key) is determined by testing whether gcd(q, N)=1. If either $\mu \notin \Omega$ or gcd(q, N)≠1, then the server rejects authentication. Otherwise, in step 320 the server calculates parameter p' as a random hash function H of parameters (N,e,m,$\mu$,π). In step 322 the server determines whether $F_{PK}(p')$ is an element of the message space of the RSA public key by determining whether gcd(p', N)=1. If gcd(p', N)≠1 then $F_{PK}(p')$ is not an element of the message space of the RSA public key and the server rejects authentication. If gcd(p', N)=1 then $F_{PK}(p')$ is an element of the message space of the RSA public key and authentication continues. In step 324 the server performs RSA decryption on (q/p'). Steps 326 through 340 proceed in a manner similar to steps 134 through 148 of FIG. 1B respectively. It is noted that since this third embodiment is RSA specific, the test in step 330 to determine whether $F_{PK}(p) \in S_{PK}$ (corresponding to step 138 in FIG. 1B), is performed by determining whether gcd(p, N)=1.

Figure 4A:
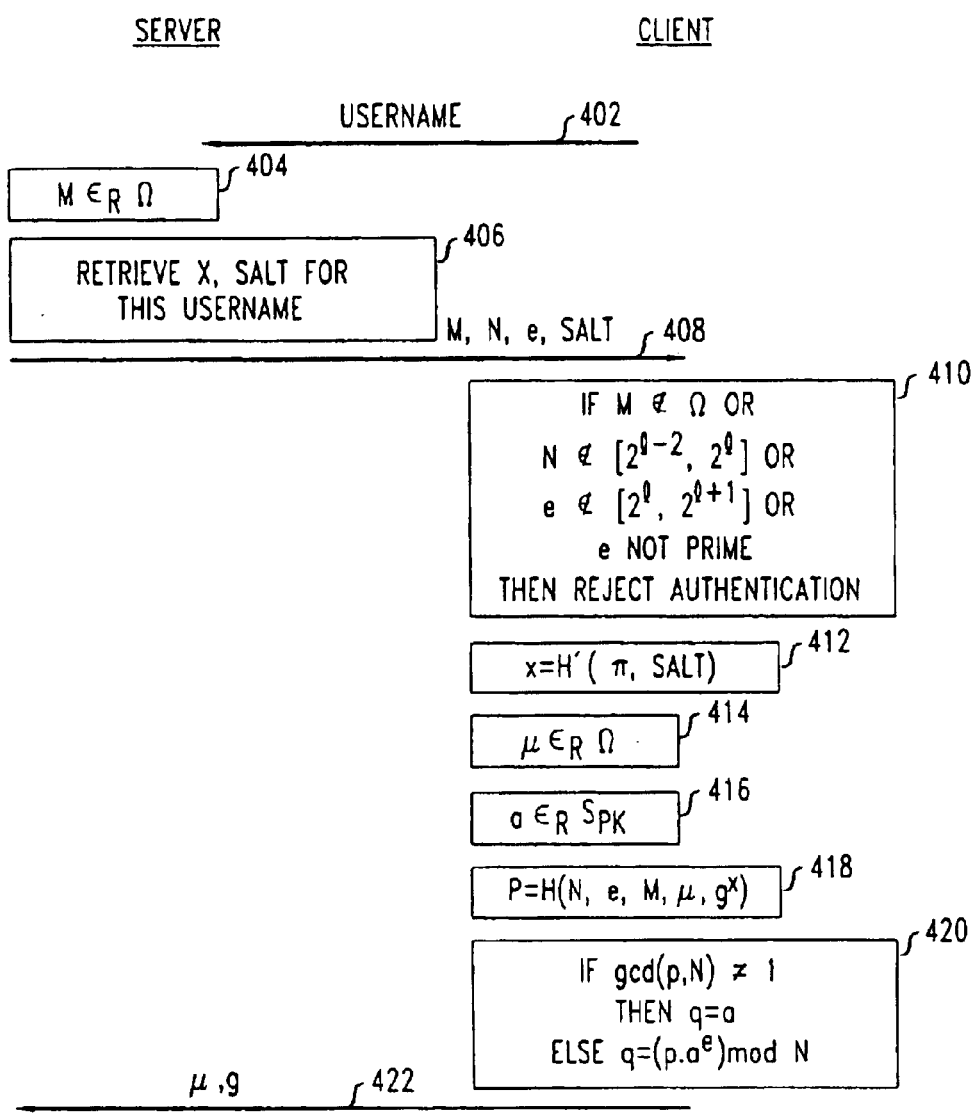
FIGS. 4A–4B show an RSA specific embodiment of the authentication protocol in which the server stores a value which is a function of the password.
Figure 4B:
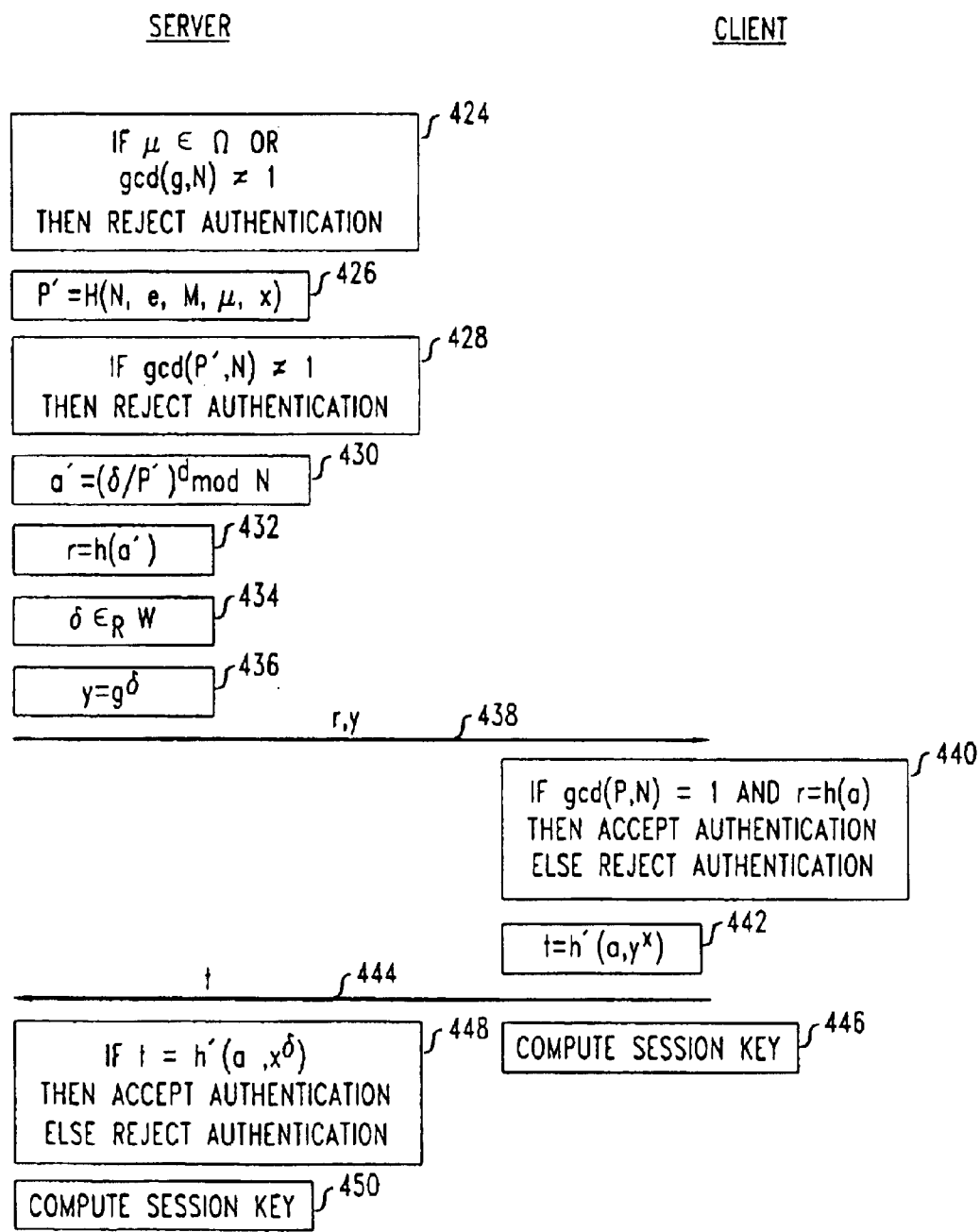

In a fourth embodiment of the invention, which will be described in conjunction with FIGS. 4A–4B, a server stores a value X which is a function of the password π and a salt value. This is similar to the second embodiment. However, the second embodiment described a protocol using any usable public key encryption scheme. This fourth embodiment uses RSA as the public key encryption scheme. Referring now to FIG. 4A, in step 402 the client initiates the protocol by sending a username to the server. In step 404 the server generates m as a random element of Ω. In step 406 the server retrieves from storage X and salt associated with the username received in step 402. In step 408 the server sends m, N, e, and salt to the client. In step 410, the client determines whether the m received from the server in step 408 is in the set Ω and whether the public key, N and e, are in the testable superset ε'. In this RSA specific embodiment, the test in step 410 of whether the public key is in the testable superset ε' is the same as the test in step 306 described in conjunction with FIG. 3A (or the alternative tests described above in conjunction with step 306). In steps 412, 414, and 416 the client generates parameters x,μ,a as described above in connection with steps 218, 220, and 222 of FIG. 2A respectively. In step 418 the client calculates parameterp as a random hash function H of parameters (N,e,m,μ,g$^x$). Next, in step 420, the client determines whether $F_{PK}(p) \in S_{PK}$ by determining whether gcd(p, N)=1, and generates parameter q as appropriate as described above in conjunction with step 314 of FIG. 3A. The client then transmits μ,q to the server in step 422.

In step 424 the server determines whether $\mu \in \Omega$ and $q \in S_{PK}$. The test of whether $q \in S_{PK}$ is determined by testing whether gcd(q, N)=1. If either $\mu \notin \Omega$ or gcd(q, N)≠1, then the server rejects authentication. Otherwise, in step 426, the server calculates parameter p' as a random hash function H of parameters (N,e,m,μ,X). Steps 428, 430, 432 then proceed in a manner similar to steps 322, 324, 326 of FIGS. 3A–3B respectively, and steps 434, 436 proceed in a manner similar to steps 240, 242 of FIG. 2B respectively.

The server transmits r,y to the client in step 438. Steps 440 through 450 proceed in a manner similar to steps 246 through 256 of FIG. 2B respectively, with the test of whether $F_{PK}(p) \in S_{PK}$ of step 440 being performed in the RSA specific manner by testing whether gcd(p, N)=1.

The inventors have proven that a mutual authentication protocol in accordance with the present invention is as secure as the underlying public key encryption scheme. Thus, in the RSA specific embodiments, the inventors have proven that the protocol is as secure as the RSA encryption scheme. An outline of the proof follows.

To prove that the present invention is a secure mutual authentication protocol, we give a reduction argument from the security of the protocol to the security of the encryption function used. Specifically, we provide a simulator which takes an encryption function and ciphertext as input, and simulates the protocol with a randomly chosen password against an adversary, such that one of the following events occurs:

1. There is a rare occurrence, such as some randomly chosen values collide (that is, are equal). This is shown to occur with very low probability, say β.
2. There is an event in which the simulator can deduce the decryption to the ciphertext with non-negligible probability.
3. None of the above. In this case, we prove directly that the adversary has at most a $$\frac{v}{d}$$

probability of breaking the protocol, where v is the number of active "spoofing" attacks and d is the number of possible passwords.

Now consider an adversary that breaks the protocol with probability $$\frac{v}{d} + \varepsilon$$

for non-negligible ε. (Informally, this means that the adversary can break the protocol with significantly more probability that simply guessing passwords and attempting to login with each one, which we claim is impossible.) Using this adversary we will be able to construct an algorithm A that will take an encryption function and ciphertext as input and decrypt the ciphertext with non-negligible probability. A will run the adversary against the simulator. Let $E_1$, $E_2$ and $E_3$ be the three events described above, and let B be the event that the adversary breaks the protocol. From the above discussion, one can see that $$\frac{v}{d} + \varepsilon \leq Pr(B) \leq Pr(E_1) + Pr(B \wedge \overline{E_1}) =$$
$$Pr(E_1) + Pr(B \wedge E_2 \wedge \overline{E_1}) + Pr(B \wedge \overline{E_2} \wedge \overline{E_1}) \leq$$
$$Pr(E_1) + Pr(E_2) + Pr(B \wedge E_3) =$$
$$Pr(E_1) + Pr(E_2) + Pr(B \mid E_3) \cdot Pr(E_3) \leq$$
$$Pr(E_1) + Pr(E_2) + Pr(B \mid E_3) \leq \beta + Pr(E_2) + \left(\frac{v}{d}\right)$$

and thus $Pr(E_2) \geq \varepsilon - \beta$, which is non-negligible. Therefore A can decrypt the ciphertext with non-negligible probability, which contradicts the security of the encryption function.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method for mutual network authentication between a client and a server utilizing a public key encryption scheme comprising the steps, performed at said client, of:
   receiving a public key from said server;
   determining whether said public key is an element of a testable superset of the set of all public keys of said public key encryption scheme; and
   (i) if said public key is not an element of said testable superset then rejecting authentication; or (ii) if said public key is an element of said testable superset then performing the steps of:
generating a parameter p as a function of at least said public key and a password;
determining whether the public key space mapping function, $F_{PK}$, applied to p, $F_{PK}(p)$, is an element of the message space of said public key;
if $F_{PK}(p)$ is not an element of the message space of said public key, then:
setting a parameter q to a substantially random element of the message space of said public key; and
transmitting q to said server.

2. The method of claim 1 wherein p is further generated as a function of at least a parameter m received from said server.

3. The method of claim 2 wherein p is further generated as a function of at least a substantially random number $\mu$.

4. The method of claim 1 further comprising the steps, performed at said client, of:
if said public key is an element of said testable superset then performing the steps of:
generating a parameter p as a function of at least said public key and a password;
determining whether the public key space mapping function, $F_{PK}$, applied to p, $F_{PK}(p)$, is an element of the message space of said public key;
if $F_{PK}(p)$ is an element of the message space of said public key then:
generating a parameter q by encrypting a substantially random element of the message space of said public key using said public key and performing the group operation of the public key message space on the result and $F_{PK}(p)$; and
transmitting q to said server.

5. The method of claim 4 wherein p is further generated as a function of at least a parameter m received from said server.

6. The method of claim 5 wherein p is further generated as a function of at least a substantially random number $\mu$.

7. The method of claim 6 further comprising the step of:
generating a session key using the Diffie-Hellman protocol with m and $\mu$ as parameters.

8. The method of claim 1 further comprising the steps, performed at said client, of:
if said public key is an element of said testable superset then performing the steps of:
generating a parameter p as a function of at least said public key and a function of a password;
determining whether the public key space mapping function, $F_{PK}$, applied to p, $F_{PK}(p)$, is an element of the message space of said public key;
if $F_{PK}(p)$ is not an element of the message space of said public key, then setting a parameter q to a substantially random element of the message space of said public key; and
transmitting q to said server.

9. The method of claim 8 wherein said function of a password is a one way function of a hash of the password.

10. The method of claim 8 wherein p is further generated as a function of at least a parameter m received from said server.

11. The method of claim 10 wherein p is further generated as a function of at least a substantially random number $\mu$.

12. The method of claim 1 further comprising the steps, performed at said client, of:
if said public key is an element of said testable superset then performing the steps of:
generating a parameter p as a function of at least said public key and a function of a password;
determining whether the public key space mapping function, $F_{PK}$, applied to p, $F_{PK}(p)$, is an element of the message space of said public key;
if $F_{PK}(p)$ is an element of the message space of said public key then:
generating a parameter q by encrypting a substantially random element of the message space of said public key using said public key and performing the group operation of the public key message space on the result and $F_{PK}(p)$; and
transmitting q to said server.

13. The method of claim 12 wherein said function of a password is a one way function of a hash of the password.

14. The method of claim 12 wherein p is further generated as a function of at least a parameter m received from said server.

15. The method of claim 14 wherein p is further generated as a function of at least a substantially random number $\mu$.

16. The method of claim 15 further comprising the step of:
generating a session key using the Diffie-Hellman protocol with m and $\mu$ as parameters.

17. A method for mutual network authentication between a client and a server comprising the steps, performed at said server, of:
transmitting a public key of a usable public key encryption scheme to a client wherein said public key is an element of a testable superset of the set of all public keys of said usable public key encryption scheme; and
receiving, as a parameter q from said client, an element of the message space of said public key; wherein if the public key space mapping function $F_{PK}$ applied to a parameter p, $F_{PK}(p)$, where p is generated at said client as a function of at least said public key and a password, is not an element of the message space of said public key then:
receiving as parameter q a substantially random element of the message space of said public key.

18. The method of claim 17 wherein, if the public key space mapping function, $F_{PK}$, applied to a parameter p, $F_{PK}(p)$, where p is generated at said client as a function of at least said public key and a password, is an element of the message space of said public key then:
receiving as parameter q the result of the group operation of the public key message space on a public key encryption of a substantially random element of the public key message space and $F_{PK}(p)$.

19. The method of claim 17 wherein, if the public key space mapping function, $F_{pk}$, applied to a parameter p, $F_{PK}(p)$, where p is generated at said client as a function of at least said public key and a function of a password, is not an element of the message space of said public key then:
receiving as parameter q a substantially random element of the message space of said public key.

20. The method of claim 19 wherein said function of a password is a one way function of a hash of the password.

21. The method of claim 17 wherein, if the public key space mapping function, $F_{PK}$, applied to a parameter p, $F_{PK}(p)$, where p is generated at said client as a function of at least said public key and a function of a password, is an element of the message space of said public key then:
receiving as parameter q the result of the group operation of the public key message space on a public key encryption of a substantially random element of the public key message space and $F_{PK}(p)$.

22. The method of claim 21 wherein said function of a password is a one way function of a hash of the password.

23. The method of claim 17 wherein said public key encryption scheme is RSA and wherein said public key comprises parameters N and e, and wherein said public key is chosen by said server such that:
   N is greater than a value;
   e is greater than N; and
   e is prime.

24. The method of claim 17 wherein said public key encryption scheme is RSA and wherein said public key comprises parameters N and e, and wherein said public key is chosen by said server such that:
   N is within a value range;
   e is within a value range; and
   e is prime.

25. The method of claim 17 wherein said public key encryption scheme is RSA and wherein said public key comprises parameters N and e, and wherein said public key is chosen by said server such that:
   e is a predetermined value; and
   N is within a value range.

26. A method for mutual network authentication between a client and a server utilizing the RSA encryption scheme comprising the steps, performed at said client, of:
   receiving an RSA public key (N, e) from said server;
   determining if said RSA public key (N, e) is an element of a testable superset of the set of all public keys of said RSA encryption scheme, wherein in said step of determining
      (i) if said RSA public key (N, e) is an element of a testable superset of the set of all public keys of said RSA encryption scheme comprises the steps, performed at said client, of:
         determining whether:
            N is greater than a value;
            e is greater than N; and
            e is prime; or
      (ii) if said RSA public key (N, e) is not an element of said testable superset then rejecting authentication.

27. The method of claim 26 wherein said step of determining if said RSA public key (N, e) is an element of a testable superset of the set of all public keys of said RSA encryption scheme comprises the steps, performed at said client, of:
   determining whether:
      N is within a value range;
      e is within a value range; and
      e is prime.

28. The method of claim 26 wherein said step of determining if said RSA public key (N, e) is an element of a testable superset of the set of all public keys of said RSA encryption scheme comprises the steps, performed at said client, of:
   determining whether;
      e is a predetermined value; and
      N is within a value range.

29. The method of claim 26 further comprising the steps, performed at said client, of:
   if said RSA public key (N, e) is an element of a testable superset of the set of all public keys of said RSA encryption scheme, then performing the steps of:
      generating a parameter p as a function of at least said RSA public key (N, e) and a password;
      determining whether the public key space mapping function, $F_{PK}$, applied to p, $F_{PK}(p)$, is an element of the message space of the RSA public key;
      if $F_{KP}(p)$ is not an element of the message space of the RSA public key then:
         setting a parameter q to a substantially random element of the message space of the RSA public key; and
         transmitting q to said server.

30. The method of claim 29 wherein said step of determining whether $F_{PK}(p)$ is an element of the message space of the RSA public key comprises the step of:
   determining if the greatest common divisor of p and N is equal to 1.

31. The method of claim 29 wherein p is further generated as a function of at least a parameter m received from said server.

32. The method of claim 31 wherein p is further generated as a function of at least a substantially random number $\mu$.

33. The method of claim 26 further comprising the steps, performed at said client, of:
   if said RSA public key (N, e) is an element of a testable superset of the set of all public keys of said RSA encryption scheme, then performing the steps of:
      generating a parameter p as a function of at least said RSA public key (N, e) and a password;
      determining whether the public key space mapping function, $F_{PK}$, applied to p, $F_{PK}(p)$, is an element of the message space of the RSA public key;
      if $F_{PK}(p)$ is an element of the message space of the RSA public key then:
         generating a parameter q as $q=(p \cdot a^e) \mod N$, where a is a substantially random element of the message space of the RSA public key; and
         transmitting q to said server.

34. The method of claim 33 wherein said step of determining whether $F_{PK}(p)$ is an element of the message space of the RSA public key comprises the step of:
   determining if the greatest common divisor of p and N is equal to 1.

35. The method of claim 33 wherein p is further generated as a function of at least a parameter m received from said server.

36. The method of claim 35 wherein p is further generated as a function of at least a substantially random number $\mu$.

37. The method of claim 36 further comprising the step of:
   generating a session key using the Diffie-Hellman protocol with m and $\mu$ as parameters.

38. The method of claim 26 further comprising the steps, performed at said client, of:
   if said RSA public key (N, e) is an element of a testable superset of the set of all public keys of said RSA encryption scheme, then performing the steps of:
      generating a parameter p as a function of at least said RSA public key (N, e) and a function of a password;
      determining whether the public key space mapping function, $F_{PK}$, applied to p, $F_{PK}(p)$, is an element of the message space of the RSA public key;
      if $F_{PK}(p)$ is not an element of the message space of the RSA public key then:
         setting a parameter q to a substantially random element of the message space of the RSA public key; and
         transmitting q to said server.

39. The method of claim 38 wherein said function of a password is a one way function of a hash of the password.

40. The method of claim 38 wherein said step of determining whether $F_{PK}(p)$ is an element of the message space of the RSA public key comprises the step of:

determining if the greatest common divisor of p and N is equal to 1.

41. The method of claim 38 wherein p is further generated as a function of at least a parameter m received from said server.

42. The method of claim 41 wherein p is further generated as a function of at least a substantially random number $\mu$.

43. The method of claim 26 further comprising the steps, performed at said client, of:

if said RSA public key (N, e) is an element of a testable superset of the set of all public keys of said RSA encryption scheme, then performing the steps of:
generating a parameter p as a function of at least said RSA public key (N, e) and a function of a password;
determining whether the public key space mapping function, $F_{PK}$, applied to p, $F_{PK}(p)$, is an element of the message space of the RSA public key;
if $F_{PK}(p)$ is an element of the message space of the RSA public key then:
generating a parameter q as $q=(p \cdot a^e)$ mod N, where a is a substantially random element of the message space of the RSA public key; and
transmitting q to said server.

44. The method of claim 43 wherein said function of a password is a one way function of a hash of the password.

45. The method of claim 43 wherein said step of determining whether $F_{PK}(p)$ is an element of the message space of the RSA public key comprises the step of:

determining if the greatest common divisor of p and N is equal to 1.

46. The method of claim 43 wherein p is further generated as a function of at least a parameter m received from said server.

47. The method of claim 46 wherein p is further generated as a function of at least a substantially random number $\mu$.

48. The method of claim 47 further comprising the step of:

generating a session key using the Diffie-Hellman protocol with m and $\mu$ as parameters.

49. A method for mutual authentication between a client and a server utilizing a public key encryption scheme comprising the steps of:

said server transmitting a public key to said client;
said client determining whether said public key is an element of a testable superset of the set of all public keys of said encryption scheme; and
(i) if said client determines that said public key is not an element of said testable superset, then said client rejecting authentication; or
(ii) if said client determines that said public key is an element of said testable superset then:
said client generating a parameter p as a function of at least said public key and a password; and
said client determining whether the public key space mapping function, $F_{PK}$, applied to p, $F_{PK}(p)$, is an element of the message space of said public key.

50. The method of claim 49 wherein:

if said client determines that $F_{PK}(p)$ is an element of the message space of said public key then:
said client generating parameter q by encrypting a substantially random element a of the message space of said public key using said public key and performing the group operation of the public key message space on the result and $F_{PK}(p)$; and
transmitting q to said server.

51. The method of claim 50 further comprising the step of:

if said client determines that $F_{PK}(p)$ is not an element of the message space of said public key, then said client setting parameter q to a substantially random element of the message space of said public key.

52. The method of claim 50 further comprising the steps of:

said server determining whether q is an element of the message space of said public key;
if said server determines that q is not an element of the message space of said public key, then said server rejecting authentication;
if said server determines that q is an element of the message space of said public key, then said server generating a parameter p' as a function of at least said public key and said password;
said server determining whether the public key space mapping function, $F_{PK}$, applied to p', $F_{PK}(p')$, is an element of the message space of said public key;
if said server determines that $F_{PK}(p')$ is not an element of the message space of said public key, then said server rejecting authentication;
if said server determines that $F_{PK}(p')$ is an element of the message space of said public key, then said server:
generating a parameter a' by performing the inverse of the group operation of the public key message space on q and $F_{PK}(p')$ and decrypting the result using a secret key corresponding to said public key;
generating r=h(a'); and
transmitting r to said client.

53. The method of claim 52 further comprising the steps of:

said client determining:
a) if $F_{PK}(p)$ is an element of the message space of said public key; and
b) if
if a) or b) is not true, then said client rejecting authentication;
if a) and b) are true, then said client generating t=h'(a) and transmitting t to said server.

54. The method of claim 53 further comprising the steps of:

said server determining if t=h'(a);
if t=h'(a') then said server accepting authentication;
if t≠h'(a') then said server rejecting authentication.

55. The method of claim 54 further comprising the steps of:

if said server and said client accept authentication, then said server and said client computing session keys for subsequent secure communication.

56. The method of claim 49 further comprising the steps of:

if said client determines that said public key is an element of said testable superset then:
said client generating a parameter p as a function of at least said public key and a function of a password; and
said client determining whether the public key space mapping function $F_{PK}$ applied to p, $F_{PK}(p)$, is an element of the message space of said public key.

57. The method of claim 56 wherein:
if said client determines that $F_{PK}(p)$ is an element of the message space of said public key then:
said client generating parameter q by encrypting a substantially random element a of the message space of said public key using said public key and performing the group operation of the public key message space on the result and $F_{PK}(p)$; and
transmitting q to said server.

58. The method of claim 57 further comprising the step of:
if said client determines that $F_{PK}(p)$ is not an element of the message space of said public key, then said client setting parameter q to a substantially random element of the message space of said public key.

59. The method of claim 57 further comprising the steps of:
said server determining whether q is an element of the message space of said public key;
if said server determines that q is not an element of the message space of said public key, then said server rejecting authentication;
if said server determines that q is an element of the message space of said public key, then said server generating a parameter p' as a function of at least said public key and a function of said password;
said server determining whether the public key space mapping function, $F_{PK}$, applied to p', $F_{PK}(p')$, is an element of the message space of said public key;
if said server determines that $F_{PK}(p')$ is not an element of the message space of said public key, then said server rejecting authentication;
if said server determines that $F_{PK}(p')$ is an element of the message space of said public key, then said server:
generating a parameter a' by performing the inverse of the group operation of the public key message space on q and $F_{PK}(p')$ and decrypting the result using a secret key corresponding to said public key;
generating r=h(a'); and
transmitting r to said client.

60. The method of claim 59 further comprising the steps of:
said client determining:
a) if $F_{PK}(p)$ is an element of the message space of said public key; and
b) if r=h(a)
a) or b) is not true, then said client rejecting authentication;
if a) and b) are true, then said client generating t=h'(a) and transmitting t to said server.

61. The method of claim 60 further comprising the steps of:
said server determining if t=h'(a');
if t=h'(a') then said server accepting authentication;
if t≠h'(a') then said server rejecting authentication.

62. The method of claim 61 further comprising the steps of:
if said server and said client accept authentication, then said server and said client computing session keys for subsequent secure communication.

* * * * *